March 7, 1967 A. KLAPP ET AL 3,307,572
APPARATUS FOR SEALING THE SLUICE SPACES FOR
GASIFICATION RESIDUES
Filed Sept. 5, 1963

INVENTORS
HANS HEITKAMP &
ARNOLD KLAPP
BY Oscar B Brumback
their Attorney

United States Patent Office 3,307,572
Patented Mar. 7, 1967

3,307,572
APPARATUS FOR SEALING THE SLUICE SPACES FOR GASIFICATION RESIDUES
Arnold Klapp and Hans Heitkamp, Essen, Germany, assignors, by mesne assignments, to Koppers Company, Inc., Pittsburgh, Pa., a corporation of Delaware
Filed Sept. 5, 1963, Ser. No. 306,803
4 Claims. (Cl. 137—240)

The present invention relates to an apparatus for sealing the sluice spaces for gasification residues, as they accumulate in spaces which prevail under increased pressure and serve particularly for the gasification of finely divided solid fuels in suspension in oxygen or oxygen-enriched air.

In such processes these residues are frequently present in the form of liquid slags. It has been suggested to arrange underneath the gasification space a water-filled collecting space in which the slag draps and granulates before it is transferred to other sluices and discharge apparatus. Since the collecting space and its charge of water prevail under the same operating pressure, which may amount to 30 atmospheres and higher, as the gasification space itself, special attention must be given to the seal opposite the adjacent sluice space. Above all, care must be taken that no particles of slag may be deposited on the sealing surfaces since they could rapidly damage the sealing material as a result of their extreme hardness.

The object of the invention is to provide an apparatus which overcomes the cited difficulties and assures an absolutely reliable seal. It solves this problem by providing a lateral valve chamber which is connected to the residue collecting space at the bottom. A conical, rubber valve seat, which is vulcanized to a metallic piece, is located in the valve chamber. A hollow valve cone presses on this seat. A number of boreholes are provided on the periphery of the valve cone at the top and at the bottom. Water under pressure is sprayed through these holes for washing the valve seat. The valve rod is hollow for the purpose of supplying the water under pressure. The valve is movably and tightly mounted in the cover of the valve chamber. It is preferably operated by means of a hydraulic cylinder operating with oil.

Figure 1:
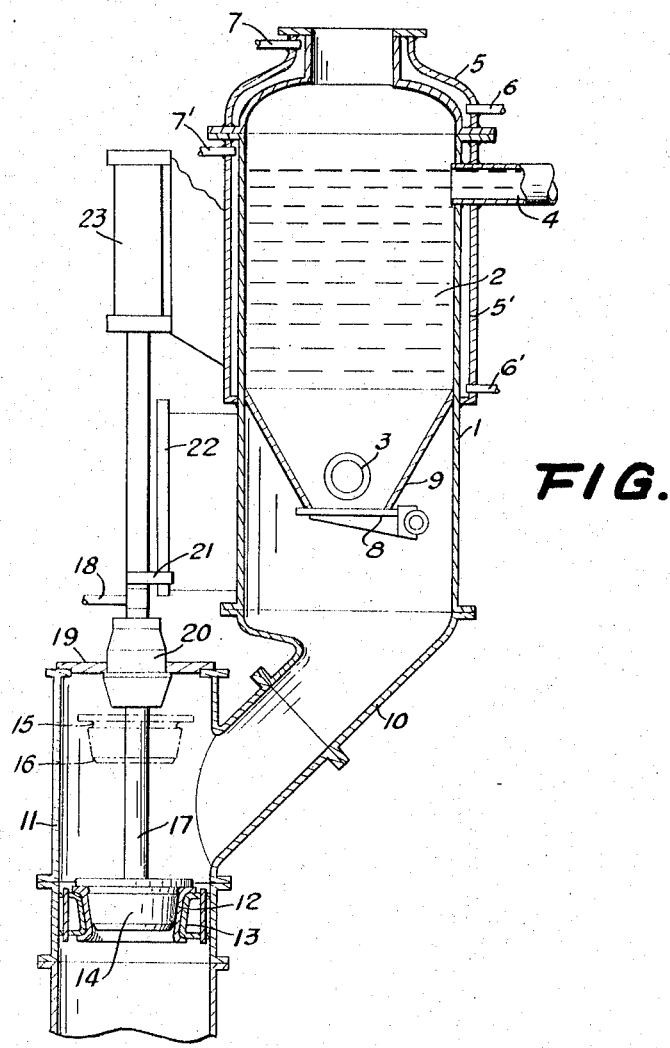
Figure 2:
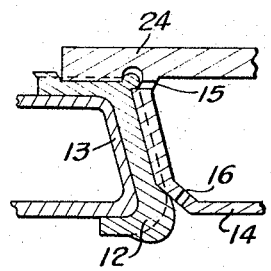

Other details of the apparatus conforming to the invention and of its operating method are explained with reference to the drawings, in which:

FIGURE 1 is a vertical section, and
FIGURE 2 shows the construction of the sealing surface in detail.

Referring to FIG. 1, the residue collecting space 1 is located underneath the slag opening of the gasification space (not illustrated). Water level 2 is maintained in the collecting space 1. Cooling water is constantly supplied through line 3 for removal of the heat which is brought into the water bath by the hot slag. The water losses resulting from formation of steam are also compensated. The cooling-water drain is indicated by 4. The upper part of the collecting space is provided with cooling jackets 5 and 5', respectively, because of the high temperatures prevailing here. Cooling jackets 5 and 5' have inlet lines 6 and 6', respectively, and discharge lines 7 and 7'. Furthermore, a valve 8 is provided at the lower conical part of the collecting space 1.

The valve chamber 11 is located underneath the residue collecting space and is connected with the latter by reducing pipe 10. The vertical axis of the valve chamber 11 is arranged laterally to that of the collecting space. A sluice space (not illustrated) is connected at the bottom of the valve chamber. The valve seat consists of a layer of rubber 12 which is vulcanized to the metallic piece 13. The valve cone 14, the open position of which is indicated by broken lines, has two rows of boreholes 15 and 16 through which flows the rinsing water that is supplied by the hollow valve rod 17. The rinsing water flows into the valve rod through an at least partially flexible line 18.

The valve rod 17 is tightly and vertically movably mounted in the cover 19 of the valve chamber 11 by means of bearing 20 and also has a guide means 21. The guide bar 22 is fastened at the lower part of the collecting space 1.

Cylinder 23 is also rigidly connected with the collecting space and is preferably operated hydraulically with oil. Cylinder 23 effects the motion for closing and opening the valve cone 14.

The valve is indicated in detail in the closed state in FIG. 2. The particular elastic alteration of shape of valve seat 12, which is also pressed into the annular groove 24 of the valve cone 14, is clearly apparent. The shape of the rubber coating in the released state is indicated in broken lines. Furthermore, the position of the boreholes 15 and 16 is illustrated in this figure.

The operating method of the apparatus of the invention is as follows:

Liquid slag passes from the gasifier into the water bath 2 of the residue collecting space 1, where it is granulated and accumulates above the closed valve 8 in the conical part 9 of the collecting space. The temperature of the water bath is maintained somewhat below 70° C. by continuous introduction and discharge of water by means of lines 3 and 4.

When the accumulated slag reaches a specified amount, the valve is first opened by the hydraulic cylinder 23 and then valve 8 is opened. The granulated slag now flows through the piece of pipe 10 and valve 11 into the sluice space connected thereto. Valve 8 is again closed when the collecting space is emptied. To be sure, additional slag constantly flows as a result of the continuous operation of the gasifier. Water that is under a higher pressure than that in the valve chamber is forced through the hollow valve rod 17 into the valve cone 14 and leaves as jets from the boreholes 15 and 16. This produces a double spray of water around the valve cone. This keeps the entrained particles of slag away from it. During the subsequent closing process the lower spray washes away the particles of slag adhering to the conical valve seat 12, and the upper spray washes the seat when it is close to it, so that the seat is washed during the entire closing motion.

If some fine particles of slag should have been deposited, the rubber coating of the valve seat alters its shape and the seal is also assured. The rubber coating has the property of being capable of pressing these particles in it without local damage. When the valve is opened, the rubber coating returns to its natural position and ejects these imbedded particles to its surface, so that they can be washed away by the water jets in the next closing process. Consequently, there is an assurance that the same particles of slag cannot again be pressed into the rubber coating at the same place.

We claim:
1. A valve chamber for receiving chilled residue from a collecting space comprising:
   (a) a wall and end closures defining said valve chamber adapted to communicate with said collecting space;
   (b) a valve seat mounted in one end closure that is made of a resiliently deformable material;
   (c) a hollow frusto-conical valve element disposed in said valve chamber and movable into and out of engagement with said valve seat, said frusto-conical valve having a plurality of apertures therein in spaced apart first and second regions adjacent the respective smaller and larger ends of said valve;
   (d) means to supply a liquid to said hollow valve at a pressure greater than the pressure within said valve chamber; and

(e) means mounted to said other end closure to reciprocate said valve relative to said valve seat whereby said liquid flowing in jet form from said apertures in the first region of said valve impinges upon said valve seat and cleans it as said valve enters said valve seat, and said liquid flowing in jet form from said apertures in said second region impinges upon said valve seat a second time as said valve completes seating.

2. The invention of claim 1 wherein:
    (a) said means to reciprocate said valve is a cylinder-piston arrangement.

3. The invention of claim 2 including:
    (a) a groove in said valve adjacent the large end thereof which, upon contacting the resiliently deformable valve seat material, deforms and at least partially fills said groove and said valve is seated in said valve seat.

4. The invention of claim 1 wherein:
    (a) said frusto-conical valve deforms said valve seat whereby particles of said chilled residue that are imbedded in said seat are rejected when said valve element is raised and the said resilient seat material returns to its normal state of rest.

References Cited by the Examiner

UNITED STATES PATENTS

| | | | |
|---|---|---|---|
| 691,975 | 1/1902 | Schaaf | 137—240 X |
| 870,487 | 11/1907 | Bertram | 137—240 |
| 1,604,712 | 10/1926 | Nordstrom | 137—240 |
| 2,305,724 | 12/1942 | Luetzelschwab | 137—240 |
| 2,375,436 | 5/1945 | Noack | 110—165 |
| 2,652,175 | 9/1953 | Davis | 137—240 X |
| 2,704,704 | 3/1955 | Ogarzaly | 302—14 X |
| 2,705,016 | 3/1955 | Saar | 137—240 X |
| 2,938,751 | 5/1960 | Nogami | 302—14 X |
| 3,033,657 | 5/1962 | Smith | 137—240 X |
| 3,218,998 | 11/1965 | Fairman | 110—165 |

CLARENCE R. GORDON, *Primary Examiner.*

WILLIAM F. O'DEA, *Examiner.*